United States Patent [19]

Ritzenthaler

[11] Patent Number: 5,221,009

[45] Date of Patent: Jun. 22, 1993

[54] MOBILE MOUNT SYSTEM

[76] Inventor: Robert Ritzenthaler, 1181 Kempton Park, McKinney, Tex. 75069

[21] Appl. No.: 839,209

[22] Filed: Feb. 20, 1992

[51] Int. Cl.$^5$ ................................................ A47F 7/00
[52] U.S. Cl. ...................................... 211/18; 267/156; 248/219.1; 248/123.1
[58] Field of Search ............... 248/218.4, 219.1, 219.2, 248/219.3, 219.4, 123.1, 297.1, 331, 162.1, 333, 330.1; 211/18, 22, 17; 254/364; 242/107; 267/156, 155, 154, 179, 285

[56] References Cited

U.S. PATENT DOCUMENTS

| | | |
|---|---|---|
| 371,326 | 10/1887 | Jeffery . |
| 478,805 | 7/1892 | Munson ................................. 211/22 |
| 557,567 | 4/1896 | Eddy . |
| 577,808 | 2/1897 | Myers . |
| 585,910 | 3/1897 | Crisp et al. . |
| 602,415 | 5/1898 | Moore . |
| 608,393 | 8/1898 | Jackson et al. ......................... 211/18 |
| 610,656 | 2/1898 | Martin . |
| 614,503 | 1/1898 | Sackett . |
| 618,394 | 1/1899 | Clark . |
| 618,999 | 2/1899 | Sayer . |
| 619,344 | 2/1899 | Pyott, Jr. . |
| 675,453 | 6/1901 | Sturgess .............................. 242/107 |
| 679,794 | 8/1901 | Sweet . |
| 764,744 | 7/1904 | Sargeant . |
| 1,435,110 | 11/1922 | Efford . |
| 2,172,902 | 8/1938 | Chalk . |
| 2,797,817 | 7/1957 | Shugarman . |
| 3,039,318 | 6/1962 | Clarke .................................. 242/107 |
| 3,070,194 | 12/1962 | Peterson ........................ 248/219.1 X |
| 3,138,260 | 6/1964 | Tedrick . |
| 3,877,622 | 4/1975 | McLain ............................... 211/22 X |
| 3,883,002 | 5/1975 | Moore . |
| 3,973,656 | 8/1976 | Zumbro ......................... 248/330.1 X |
| 3,976,200 | 8/1976 | Munns . |
| 4,136,782 | 1/1979 | Hugel . |
| 4,187,996 | 2/1980 | Ehrlich ......................... 268/330.1 X |
| 4,209,156 | 6/1980 | Kashden . |
| 4,284,840 | 8/1981 | Baker ............................ 248/218.4 X |
| 4,671,872 | 6/1987 | Cramer et al. ................ 248/219.1 X |
| 4,700,845 | 10/1987 | Fretter . |
| 4,749,089 | 6/1988 | Stewart, III . |
| 4,813,550 | 3/1989 | Saeks ..................................... 211/17 |

Primary Examiner—Blair M. Johnson
Assistant Examiner—Korie H. Chan
Attorney, Agent, or Firm—Jones, Day, Reavis & Pogue

[57] ABSTRACT

An improved mobile mount system including a vertical support member, an object mount slideably coupled to the vertical support member and a constant force member mounted at the top of the vertical support member and coupled to the mount to provide a constant force thereto for lifting an object place down.

10 Claims, 3 Drawing Sheets

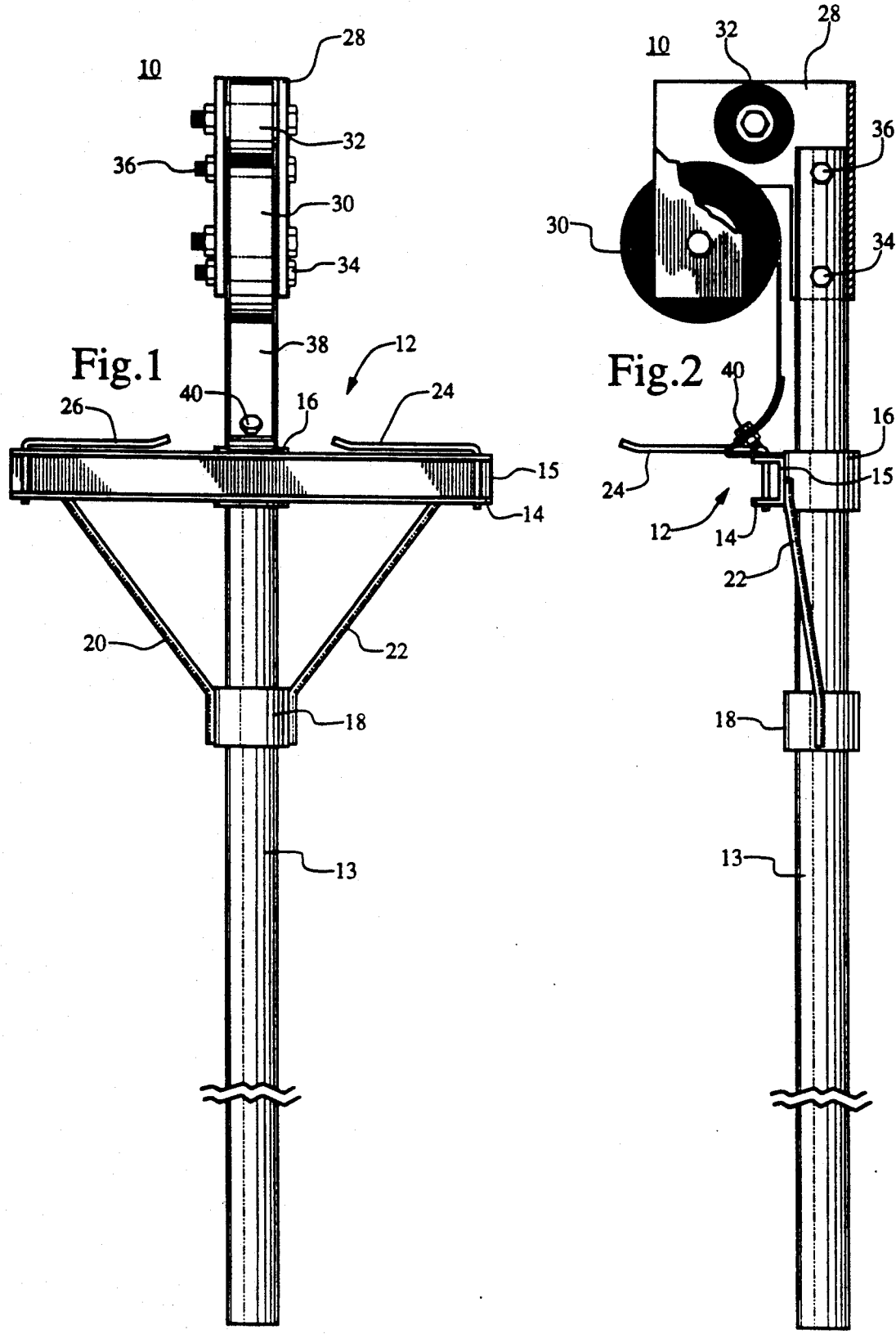

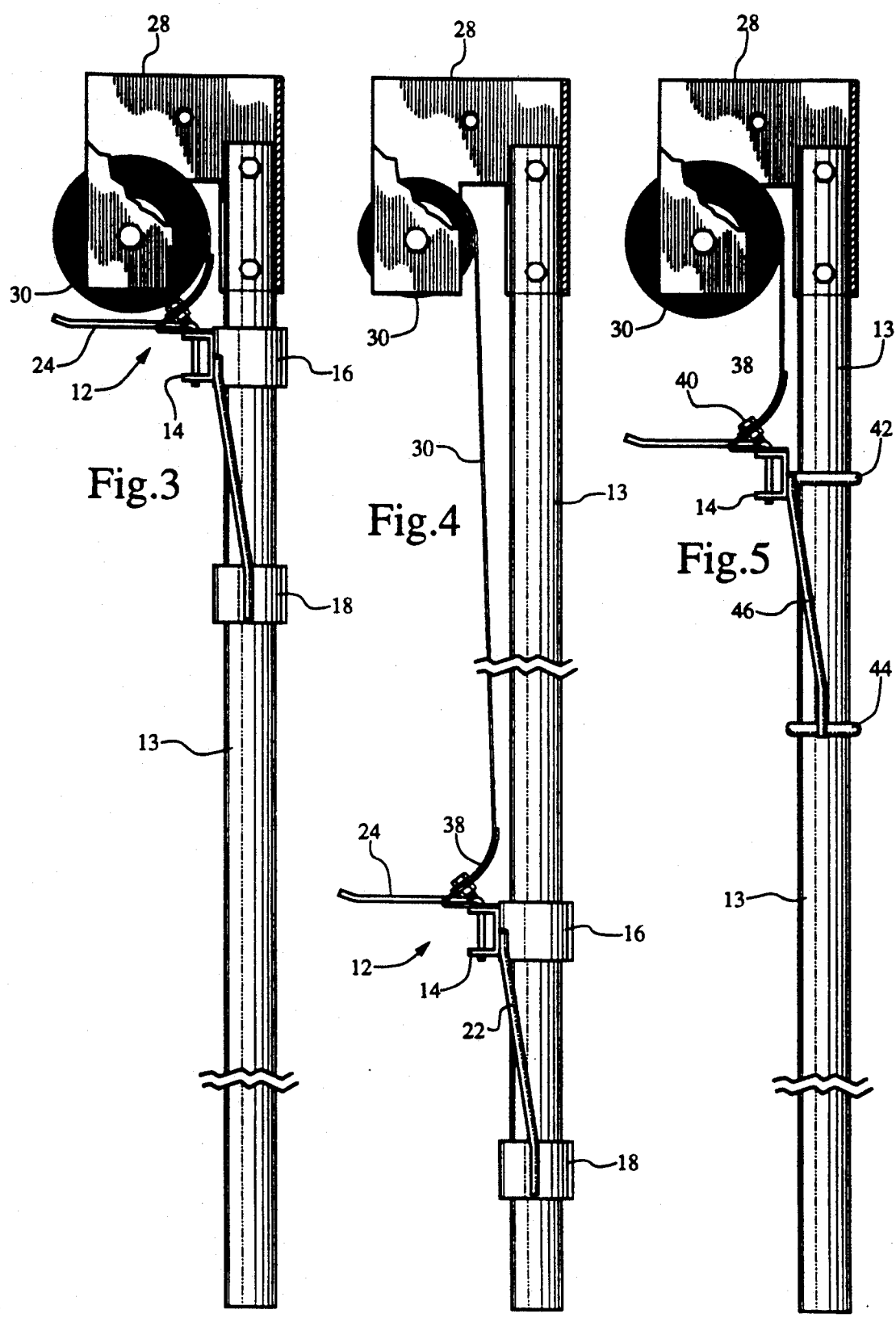

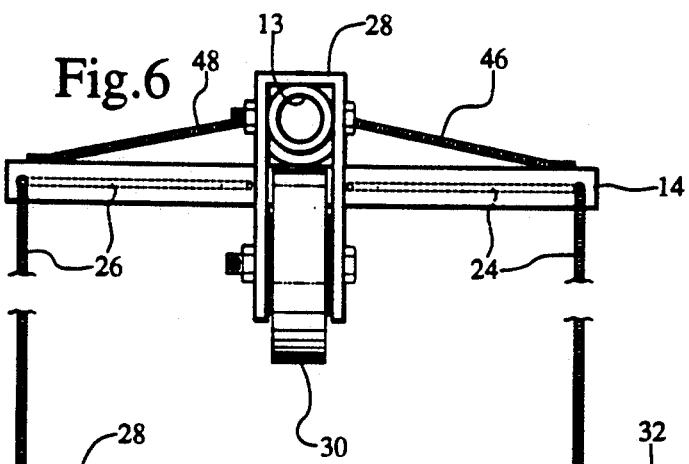
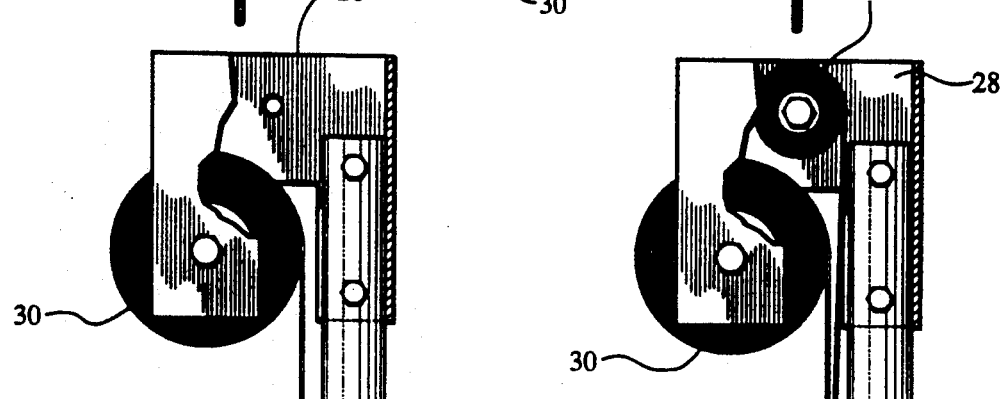
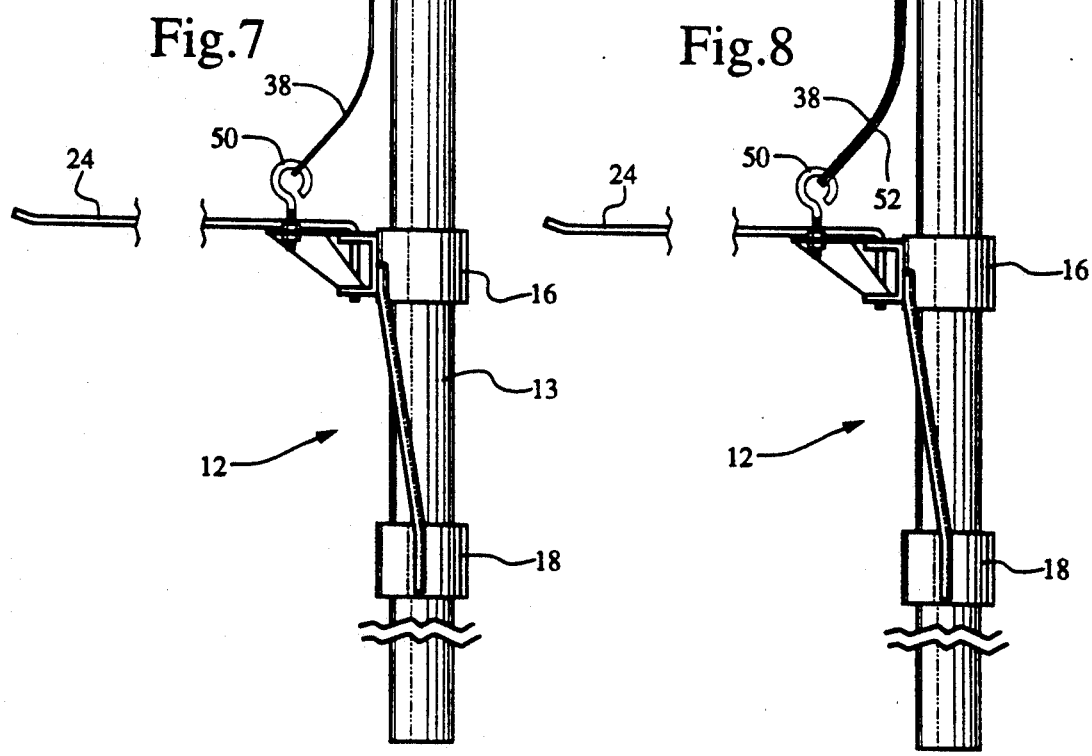

MOBILE MOUNT SYSTEM

FIELD OF THE INVENTION

The present invention relates to an improved mobile mount system. In particular, the invention relates to a system for placing a bicycle or other object on a wall mount when not in use and then utilizing constant force springs for elevating the wall mount with the mounted object to a position where it will not interfere with objects or activity below.

BACKGROUND OF THE INVENTION

The storage of bicycles presents peculiar problems and opportunities because a bicycle is relatively long, narrow and of varying weights. Bicycles typically are stored by placing them on a wall mount. The mount often is as simple as two spaced hooks extending from a wall and the hooks may be specially adapted to receive the horizontal tube of the bicycle frame or the bicycle wheels. Various refinements of bicycle wall mounts are disclosed in U.S. Pat. Nos. 602,415, 3,883,002 to Moore, U.S. Pat. No. 3,976,200 to Munns, U.S. Pat. No. 4,136,782 to Hugel, U.S. Pat. No. 4,700,845 to Fretter and U.S. Pat. No. 4,749,089 to Stewart.

A bicycle wall mount has limited utility however. A wall mount primarily prevents the bicycle from falling over or being tipped over. It does not particularly protect the bicycle from being damaged by other objects; neither does it remove the bicycle from traffic areas. In addition, the wall mount itself may be an obstacle when it is not storing a bicycle.

One early system for providing a bicycle rack that could be elevated is disclosed in U.S. Pat. No. 602,415 to Moore in which a cylindrical wall mount has a pulley at the top thereof with a weight attached to a cord or chain which is directed over a pulley at the top of the vertical support member. The cord extends downwardly on the outside of the vertical support member and is attached to a bicycle rack. The size of the weight is adjusted such that the rack and the bicycle carried thereby may be easily raised or lowered.

One difficulty with this type of mounting is that weight is inside the vertical support and thus is not easily accessible. Further, it may become necessary to change the size of the weight depending upon the size or weight of the bicycle being placed on the rack. Thus, if a heavier bicycle is used, the existing weight may not be sufficient to easily enable the bicycle to be raised.

Another attempt to improve the utility of the bicycle wall mount is disclosed in U.S. Pat. No. 3,907,133 to Kropelnitski. The Kropelnitski patent discloses a bicycle mount contained on a vertical rail attached to a wall. The mount may be elevated manually by the use of a cable and pulley scheme. The elevated mount is secured by a pin inserted through the mount and rail. The Kropelnitski apparatus elevates the mounted bicycle but is cumbersome to use.

It is desired, then, to have a bicycle mount that secures a bicycle from harm, positions the bicycle away from the trafficked areas, is not an obstacle in itself when not storing a bicycle and is easy to use. Such a device is disclosed in my U.S. Pat. No. 5,183,162 issued Feb. 2, 1993 and entitled "Mobile Mount System". This system functions well and requires a motor or other power source to drive an endless band moving within an elongated enclosed track to which is attached a bicycle rack. Thus, the bicycle may be raised or lowered along with the bicycle rack by energizing a motor.

The present invention provides a simplified device for raising and lowering bicycles that utilizes constant force springs that well known in the aft. The springs come with different forces such as, for example only, twenty-five pounds, thirty-three pounds, five pounds and the like. With the use of these constant force springs attached to a bike rack, any bike can be raised up or down with about three to five pounds force. In the preferred embodiment, the bike rack is mounted on a fiberglass tube vertical support member. The constant force spring or springs are mounted on the upper end of the fiberglass tube with the outer end of the spring or springs attached to the bike rack. The bike rack has two guide members attached to it about seven inches apart. The first guide member is directly attached to the back of the rack and the second guide member is attached by vertical support rods to the back of the rack. In the preferred embodiment, the two guide members are in the form of rings that are about seven inches apart. The upper ring is directly attached to the back of the bike rack and the lower ring is attached to the back of the bike rack with first and second rods connected to the sides thereof and extending upwardly to the rack. Each of the first and second rods is attached to the ring at a point on each side of the ring substantially in alignment with the center of the fiberglass vertical support tube. This causes the lifting forces on the top ring to be changed from a twisting force to a straight vertical force on the bottom ring. The bike rack thus moves very easily up and down the fiberglass tube. Further, the attachment point on the rack to which the end of the constant force spring is attached is mounted at a distance from the vertical support so as to cause a clockwise rotational force on said rack as viewed from the side. When an object such as a bicycle is placed on the rack, it creates a counterclockwise rotational force that opposes and tends to cancel the rotational force caused by the constant force spring thus allowing the rack to move easily along the vertical support member because of reduced frictional forces.

The unit may come with a twenty-five or thirty-three pound constant force spring, for example. However, at least four other springs of five pounds each can be added separately and individually as needed at the top of the fiberglass tube to accommodate all bike weights.

As is well known with constant force springs, the springs are on a spool that applies a constant force to the spring. The spring is in the form of a flat elongated thin metallic piece resembling a retractible, extendible tape measure.

Thus, it is an object of the present invention to provide an improved mobile mount system that utilizes constant force springs to enable the mount to be raised or lowered with an object thereon upon the application of an additional force substantially in the range of one to five pounds.

It is also an object of the present invention to provide an improved mobile mount system that has additional smaller constant force springs that can be quickly coupled to the bicycle rack to provide additional force for heavier objects.

It is also an object of the present invention to provide an improved mobile mount system that has reduced frictional forces during movement along a vertical support, thus allowing easier movement of the mount system.

SUMMARY OF THE INVENTION

The present invention relates to an improved mobile mount system comprising a vertical support member, a mount moveably attached to the support member for carrying an object, at least one constant force spring having a housing and an extensible spring therein, the housing being mounted on the upper end of the vertical support and the outer end of the spring being coupled to the mobile mount such that a constant upward force is applied to said mount, said force being sufficient to enable said mount to be raised with an object thereon upon the application of an additional force in the range of 1-5 pounds so as to move the object to a position where it will not interfere with other objects when not in use.

BRIEF DESCRIPTION OF THE DRAWINGS

These and other objects of the present invention be more fully understood in conjunction with the accompanying drawings in which the like numbers indicate like components and in which:

FIG. 1 is a front view of one embodiment of the present invention;

FIG. 2 is a side view of the embodiment illustrated in FIG. 1 and illustrating first and second constant force springs attached to a housing on the upper portion of the vertical support member;

FIG. 3 is a side view of one embodiment of the present invention which utilizes only one constant force spring with the mobile mount in its upward position;

FIG. 4 is a side view of the mobile mount illustrated in FIG. 3 with the mount in the down position;

FIG. 5 is a side view of the preferred embodiment of the present invention in which the mobile mount is attached to the vertical support by means of two spaced rings which encircle and slide on the vertical support member;

FIG. 6 is a top view of the system disclosed in FIG. 5;

FIG. 7 is a side view of an additional embodiment of the present invention illustrating a quick disconnect for the constant force spring; and FIG. 8 is a side view of an embodiment similar to that illustrated in FIG. 7 except that an additional but smaller constant force spring is shown added to the first spring to provide additional upward pull on the mobile mount.

DETAILED DESCRIPTION OF THE DRAWINGS

While the mobile mount system can be used for raising and lowering any desired object, it will be disclosed herein in reference to a bicycle rack with a bicycle thereon.

As can be seen in FIG. 1, the mobile mount system 10 includes a rack 12 mounted on a vertical support member 13 that is preferably a fiberglass hollow tube attached to a wall in any well-known manner. The mobile mount 12 comprises a rack 14 to which is attached first and second guide members 16 and 18 slideably coupled to the vertical support 13 for guiding the rack 14 as it moves along the vertical support member 13. In the embodiment in FIG. 1, the guide members 16 and 18 are substantially narrow sections of a cylinder approximately 2" in length that surround said vertical support member 13 and are attached to the rack 14. The first guide member 16 is attached directly to the back of the rack 14 which is an elongated U-shaped body having a base 15 as shown in FIG. 2. The cylindrical portion 16 is attached to the base 15 in any well-known manner such as by welding or bolts. The second guide member 18 surrounds the cylindrical vertical support member 13 and is attached by elongated rods 20 and 22 to the base 15 of the rack 14 thus holding the first and second guide members 16 and 18 in a spaced apart relationship. In the preferred embodiment, the first and second guide members are approximately seven inches apart. It will be noted in FIG. 2 that the upper end of rod member 22 is attached to the base 15 of the U-shaped rack 14 while the lower end of the rod member 22 is connected to a point on the second guide member 18. The attachment point 40 of the spring 30 to the rack 14 causes a clockwise movement arm on the rack 14 as viewed from the side in FIG. 2. An object placed on the rack 14 causes a counterclockwise movement arm to be applied to rack 14 that opposes and tends to cancel out the clockwise force, thus enabling the mount system 12 to move easily up and down the fiberglass tube 13. Rod 20 is coupled in a similar manner to the opposite side of the guide member 18 as well as to the opposite side of the back of U-shaped rack 14. As can be seen in FIG. 2, housing 28 encloses a first constant force spring 30 and a second constant force spring 32. The first constant force spring 30 may have a pulling force of twenty-five or thirty-three pounds, for example, while the second constant force spring 32 may add an additional five pounds. In such case, if more force is desired, the end of the constant force spring 32 can also be coupled at bolt 40 as is the outer end 38 of spring 30 thus adding an additional pull to the rack 12. Folding arms 24 and 26 can extend outwardly as shown in FIG. 2 to hold a bicycle, or fold it inwardly as illustrated in FIG. 1 to be out of the way. It will be noted that housing 28 containing the constant force springs 30 and 32 is mounted to the vertical support 13 by means of bolts 34 and 36.

In FIG. 3 a side view is shown of a system similar to that in FIG. 2, except that the five pound additional spring 32 shown in FIG. 2 is missing. FIG. 3 illustrates the rack 12 in its uppermost position. FIG. 4 is a side view of the device illustrated in FIG. 3 with the rack 12 in its downward position.

In FIG. 5, in the preferred embodiment, the first and second guide members are rings that surround the cylindrical support member 13. As illustrated in FIG. 5, rings 42 and 44 are spaced from each other by rod 46, similarly to that illustrated in FIGS. 1, 2 and 3. Ring 42 is attached to the U-shaped body 14, while ring 44 is in spaced relationship to the first ring 42 and is coupled to the U-shaped body of 14 by rod 46 that is attached at the back thereof. The lower end of rod 46 is attached to the second guide member 44 at a point substantially in alignment with the center of the vertical support 13.

FIG. 6 is a top view of the embodiment illustrated in FIG. 5 although it could be a top view of any of the embodiments in like manner except for FIG. 2 which has the extra small constant force spring 32. In FIG. 6, the constant force spring housing 28 can be seen mounted to the vertical support member 13 and containing constant force spring 30. The rack 14 with arms 26 and 24 extending outwardly therefrom and shown folded inwardly in dashed lines is shown attached to upper ring 42 in any well known manner as indicated previously, such as by welding. Elongated support rods 46 and 48 extend from the lower ring 44 upwardly and outwardly to the backside 15 of the U-shaped member 14.

FIG. 7 illustrates another embodiment with a quick disconnect for the constant force spring 30. End 38 of the constant force spring 30 has an orifice therein which simply slips in the open hook 50 to quickly connect and disconnect the constant force spring. In FIG. 8 the additional smaller constant force spring 32 has its outer end 52 also slipped into the open hook 50 thus adding force as needed to raise more weight on the bicycle rack 12.

Thus, there has been disclosed an improved mobile mount system in which constant force springs are utilized to apply a constant force to the mobile mount or bicycle rack to enable it to be easily raised and lowered with a bicycle on it. If, for instance, the bicycle weighs 30 pounds and the constant force spring is 25 pounds, an additional force of 5 pounds is all that is needed to raise the bike up to the top of the vertical support member. A latch of any well-known means such as that disclosed in U.S. Pat. No. 3,907,133 could be used to hold the bicycle in any position. This system uniquely allows for additional force to be added as needed if different weight bicycles are used. Further, the connection point of the constant force spring to the bicycle rack is such that it tends to rotate the rack in a clockwise direction opposing the weight of the bicycle tending to rotate the rack in the counterclockwise condition. A small net friction force is provided on the vertical support member 13 enabling the bicycle to be easily raised and lowered.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

I claim:

1. An improved mobile mount system comprising:
a vertical support member having a lower end and an upper end;
a rack movably attached to the vertical support member for receiving an object, the rack comprising an elongated horizontally placed U-shaped body having a base portion with legs extending from said base portion and an open end formed between the legs of the U-shaped body, the open end of the U-shaped body facing outwardly from the vertical support member for receiving an object;
a housing containing at least one constant force extensible spring inside thereof, the housing being mounted at the upper end of the vertical support; and
an outer end of the spring being coupled to the rack such that a constant upward force is applied to the rack, the force being sufficient to enable the rack with an object thereon to be raised and lowered between the lower end of the vertical support member and the upper end upon the application of additional force in the range of one to five pounds greater than the combined weight of the object and the movable mount.

2. A system as in claim 1 further comprising additional constant force springs mounted on the upper end of the vertical support member and attached in parallel to the mount to supply supplemental predetermined constant upward forces to the mount as needed for objects of predetermined weight.

3. A system as in claim 2 wherein the object of a bicycle.

4. A system as in claim 3 further comprising:
first and second guide members coupled to the body of said rack and slideably coupled to the vertical support member for guiding the rack as the rack moves along the vertical support member.

5. A system as in claim 3 wherein:
said vertical support member is cylindrical in shape;
said first guide member is substantially a first portion of a hollow cylinder surrounding said vertical support member and attached to the rack in abutting relationship;
said second guide member is substantially a second portion of a hollow cylinder surrounding said vertical support member and spaced apart from said first guide member; and
rod members coupled to said first and second guide members for maintaining first and second guide members in spaced relationship.

6. A system as in claim 4 wherein:
said first guide member is a first ring attached to said U-shaped body and surrounding said cylindrical vertical support member; and
said second guide member is a second ring surrounding said cylinder vertical support member in spaced relationship with said first ring and coupled to the U-shaped body.

7. A system as in claim 4 further including:
said first guide member being fastened to the base of U-shaped body;
at least one elongated rod holding said first and second guide members in spaced relationship;
one end of said rod being coupled to the base of said U-shaped body; and
the other end of said rod being coupled to said second guide member at a point substantially in alignment with the longitudinal center of said vertical support member.

8. A system as in claim 7 further including first and second ones of said elongated rods, each having one end attached on opposite ends of the base of said U-shaped body and each having the other end attached to a point on corresponding opposite sides of said second cylindrical guide member substantially in alignment with the longitudinal center of said vertical support.

9. A system as in, claim 1 further including a mount for securing an inner end of said constant force spring, said mount being on said rack at a distance from said vertical support member so as to cause a clockwise rotational force on said rack such that when an object is placed on said rack, the object creates a counterclockwise rotational force on said rack opposing the force caused by said constant force spring thus allowing the rack to move easily along the vertical support member because of reduced frictional forces.

10. A system as in claim 1 further including additional constant force springs mounted in said housing for attachment to the rack to provide additional lifting force.

* * * * *